(12) United States Patent
Nabarowsky

(10) Patent No.: US 6,646,403 B2
(45) Date of Patent: Nov. 11, 2003

(54) ENCODER CONTROLLED STEPPER MOTOR SYSTEM

(76) Inventor: Stephen Nabarowsky, 259 Willard St., Berlin, NH (US) 03570

( * ) Notice: Subject to any disclaimer, the term of this patent is extended or adjusted under 35 U.S.C. 154(b) by 28 days.

(21) Appl. No.: 10/101,663

(22) Filed: Mar. 20, 2002

(65) Prior Publication Data

US 2003/0178963 A1 Sep. 25, 2003

(51) Int. Cl.[7] ................................................ G05B 19/10
(52) U.S. Cl. ........................ 318/567; 318/569; 318/34; 318/600
(58) Field of Search ................................ 318/567, 569, 318/34, 600

(56) References Cited

U.S. PATENT DOCUMENTS 5,278,547 A * 1/1994 Suman et al. .............. 340/5.22
5,345,112 A * 9/1994 Nazarian et al. .............. 326/39

* cited by examiner

*Primary Examiner*—Karen Masih
(74) *Attorney, Agent, or Firm*—Devine, Millimet & Branch, P.A.; Paul C. Remus; Todd A. Sullivan

(57) ABSTRACT

The present invention is a motor controller. An encoder manipulates the motor controller in a manner that is new and novel. The encoder tracks movement of a material along an assembly line and reports the results of the tracking through electronic signals. Those electronic signals are used to manipulate the motor controller to produce unique and responsive control signals to manipulate the motors, particularly during the acceleration and deceleration of the motors. Other motor control systems have used encoders as a part of a feedback loop, but none allow encoders to exert the level of control over the motors as accomplished in the present invention.

12 Claims, 8 Drawing Sheets

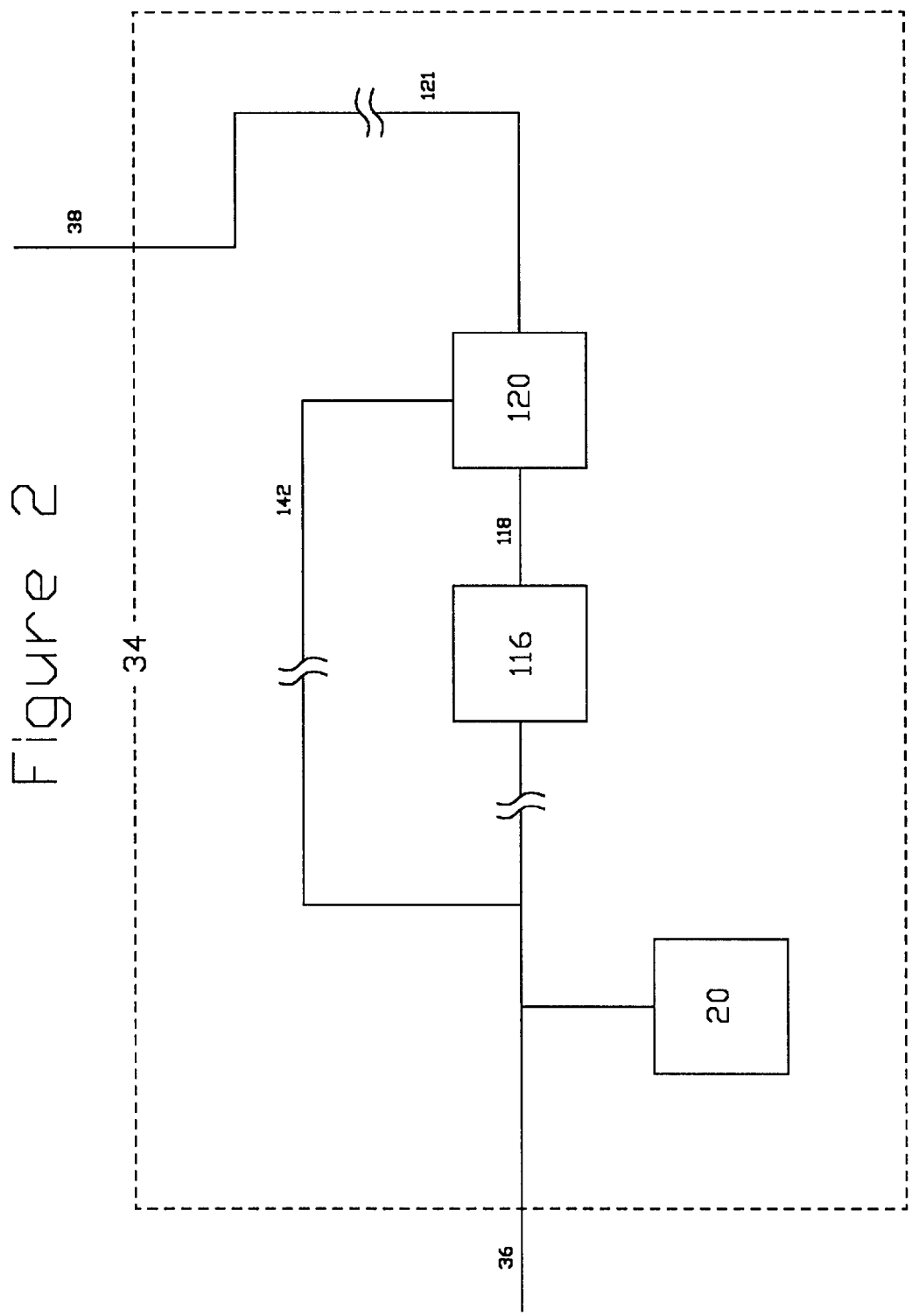

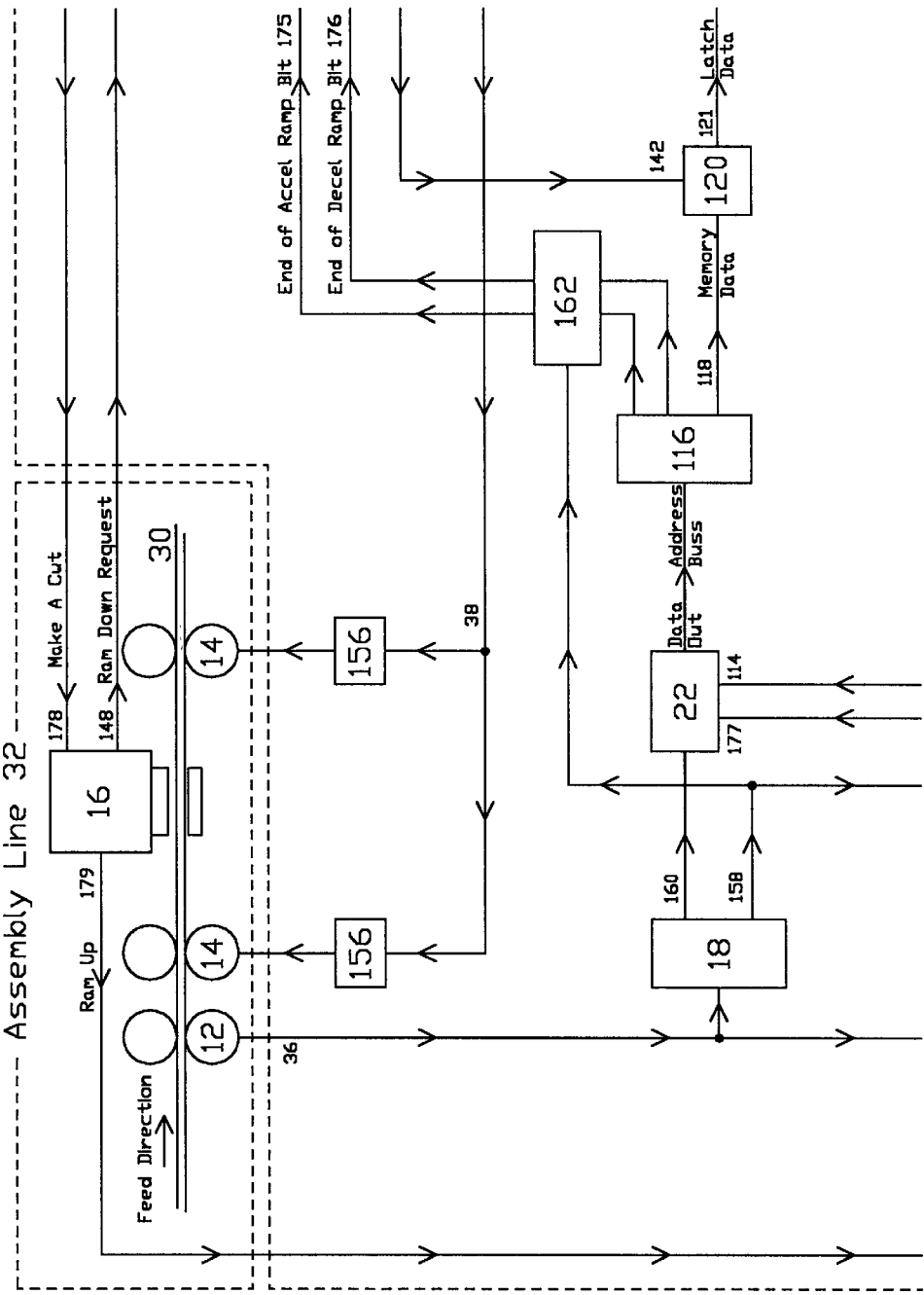
Figure 3 Quadrant 1

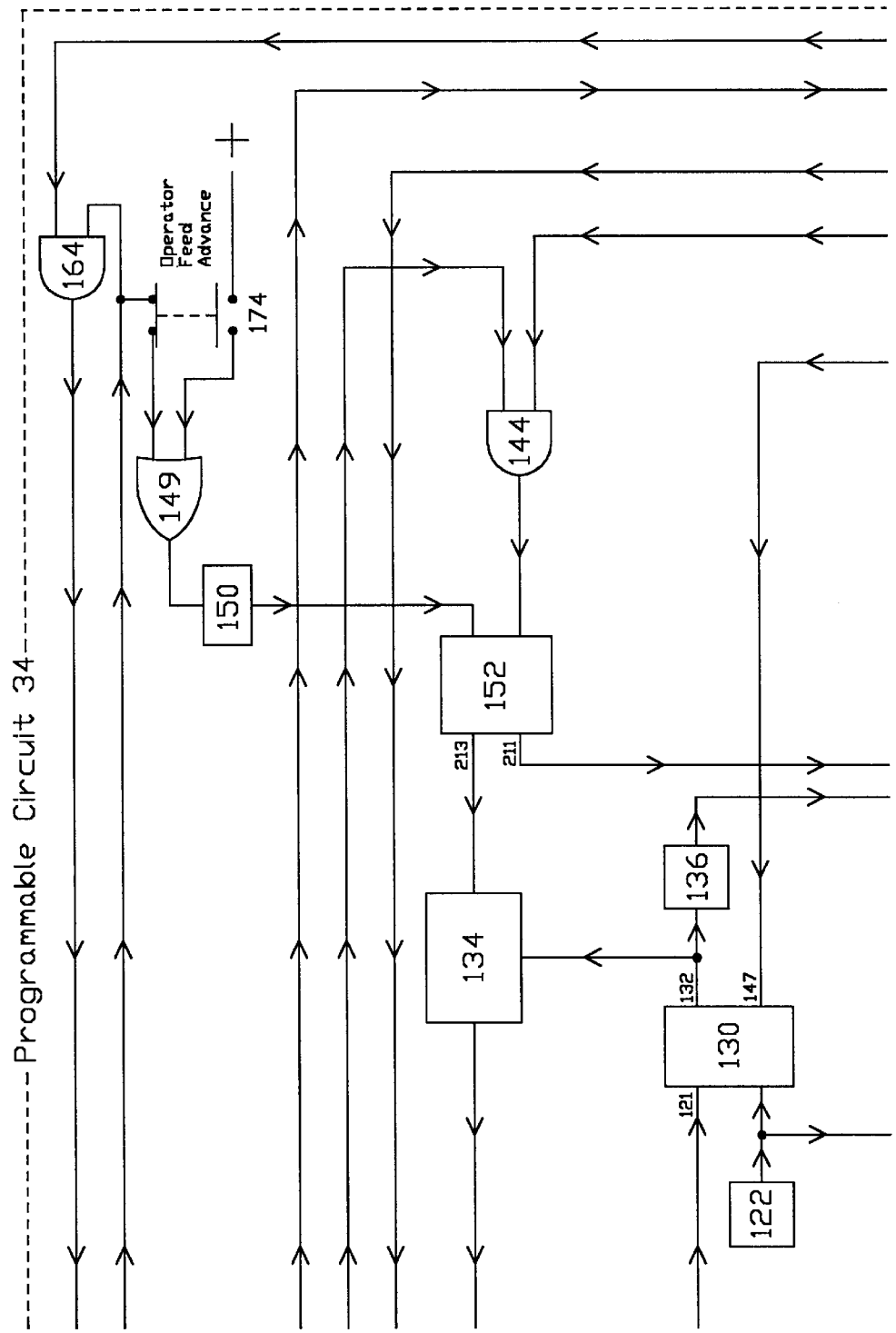

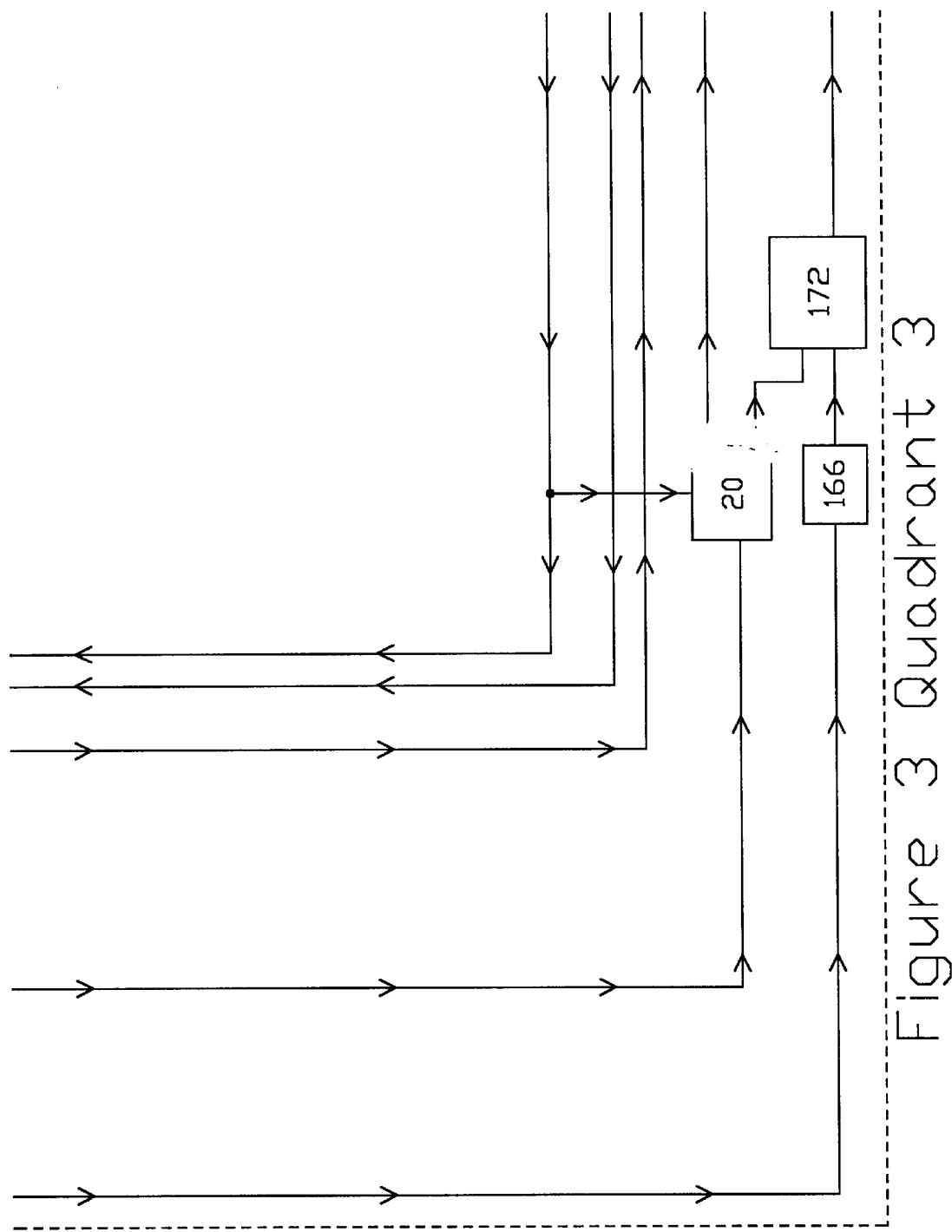

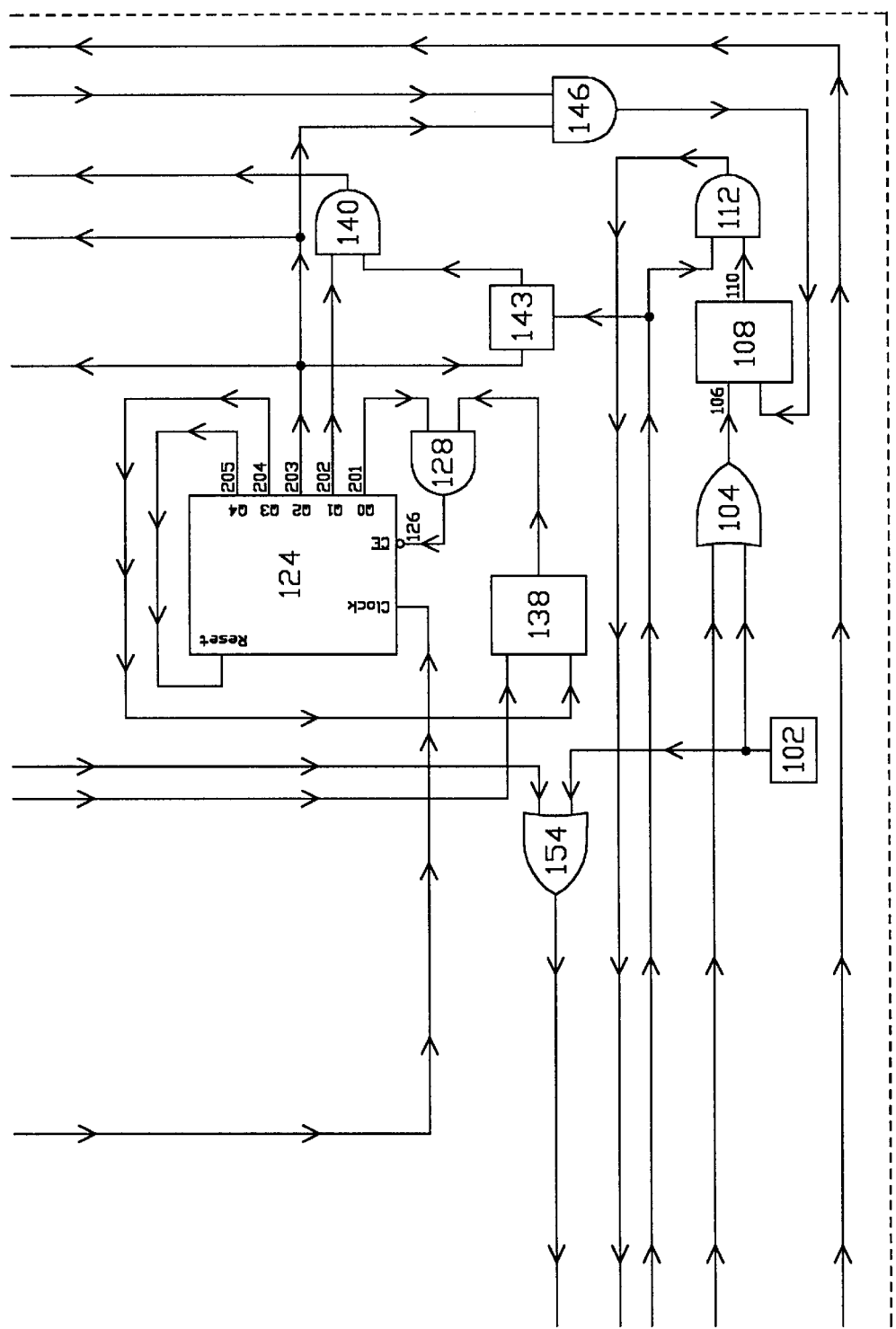

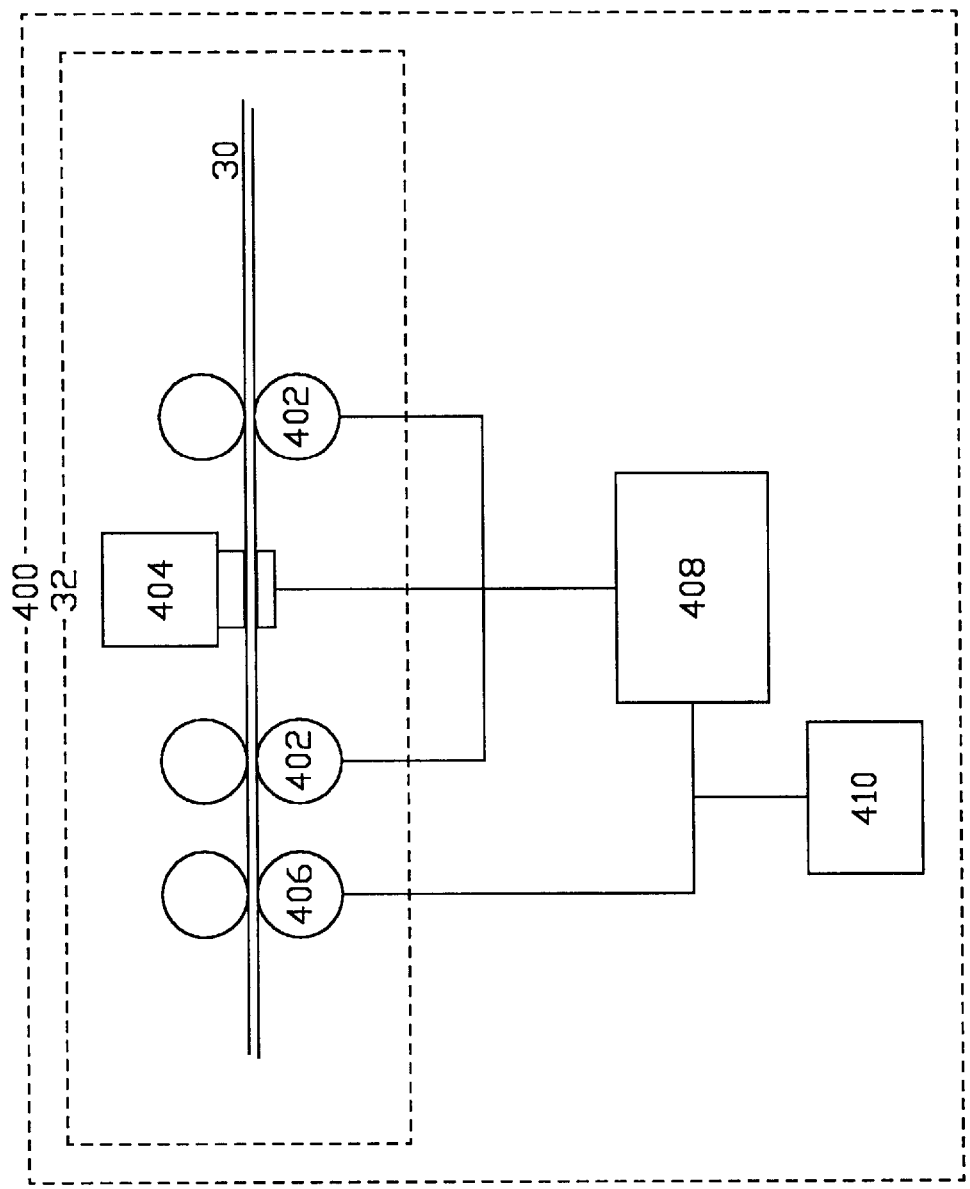

ENCODER CONTROLLED STEPPER MOTOR SYSTEM

FIELD

The present invention is in the field of motor controllers. More specifically, the present invention is in the field of stepper motor controllers.

BACKGROUND OF THE INVENTION

Stepper motors are currently used in a variety of applications, including moving paper of fabric or other material along a manufacturing assembly line. The motors are often controlled by microprocessors, which time the movement of the material along the assembly line and control other equipment based on the anticipated timed movement of the material along the assembly line. If one of the motors slips or stalls of otherwise fails to perform the task of moving the material along the assembly line, either the other equipment will continue to run damaging a portion of the material along the assembly line or the motors will stop until the system is reset. Both of these results are costly and many devices have been developed over the years to avoid the problematic slips and stalls.

Another problem caused by slips and stalls is a loss of motor efficiency. The most problematic time for the motors is when they are ramping up to full speed and capacity. During the ramping time, which is relatively brief, the material is moved is moved and processed along the assembly line at an escalating rate. Once ramping is completed, the material is moved along the assembly line at a constant speed, substantially reducing the risk of slips or stalling. Several devices have been designed to increase motor efficiency during ramping, but none can reactively prevent slips or stalling in real-time while the motors are ramping.

Finally, some materials have more problems being moved across assembly lines than others do. Felt, for instance, is a material with an inconsistent frictional coefficient. As a result, the felt is likely to slip when being pulled by the motors, particularly during the ramping up of the system, which can result in either the material being damaged or the motors being shut down, as previously explained. Therefore assembly lines that move materials with low and/or inconsistent frictional coefficients suffer greater inefficiency than other assembly lines.

The present invention is directed to a very specific problem. Along an assembly line for moving felt, there are stepper motors for moving the felt a preprogrammed distance repeatedly, The stepper motors rotate pinch roller assemblies a preprogrammed angular rotation relative to the preprogrammed distance. The anticipated result is the pinch roller assemblies move the felt the preprogrammed distance. However if the pinch roller assemblies insufficiently grip the felt, as is prone to happen with a material having a low frictional coefficient, the felt moves less than the preprogrammed distance. Another device is then initiated to manipulate a section of felt—punching holes, attaching something to the felt or otherwise manipulating it. The preprogrammed distance is directly related to an intended spacing between manipulations of sections of felt. Therefore, when the felt fails to move the intended distance, the intended spacing is not achieved.

SUMMARY OF THE INVENTION

The present invention is the realization that the motors in an assembly line can be more efficiently controlled if the timing of the motors is based on the real-time tracking of the speed of the material moving across the assembly line, particularly during the ramping up or down of the motors. The present invention uses an encoder, which mechanically tracks the speed and position of the material moving across the assembly line and translates the speed and position to electrical signals. Those electrical signals modify the timing of the motors and other devices along the assembly line.

An issue resolved by the present invention is to provide a drive system that uses an encoder to monitor and control the feed distance. Because the encoder has direct control of the system execution, each feed advance builds unique, real-time acceleration and deceleration curves. This type of direct system execution automatically compensates for losses due to friction, slippage or missed steps from the stepper motors. This approach more than doubles the speed and accuracy of the feed process over conventional systems using the same motors, feed path and material being fed.

Therefore, it is an object of the present invention to cause the assembly line to automatically correct for motor stalls or slippage rather than stopping the assembly line or damaging the material being moved along the assembly line.

It is a further object of the present invention to increase the efficiency during ramping by reacting to the increasing speed with which the material is moved across the assembly line rather than being programmed to anticipate expected speed increases.

Finally, it is a further object of the present invention to greatly increase the efficiency of assembly lines, which move materials with low and/or inconsistent frictional coefficients across the assembly line.

BRIEF DESCRIPTION OF THE DRAWINGS

FIG. 2 shows a block diagram of one embodiment of the present inventive apparatus.

FIG. 3 shows a detailed diagram of one embodiment of the present inventive apparatus.

FIG. 4 shows a block diagram of one embodiment of the present invention system.

DETAILED DESCRIPTION OF THE INVENTION

Figure 1:
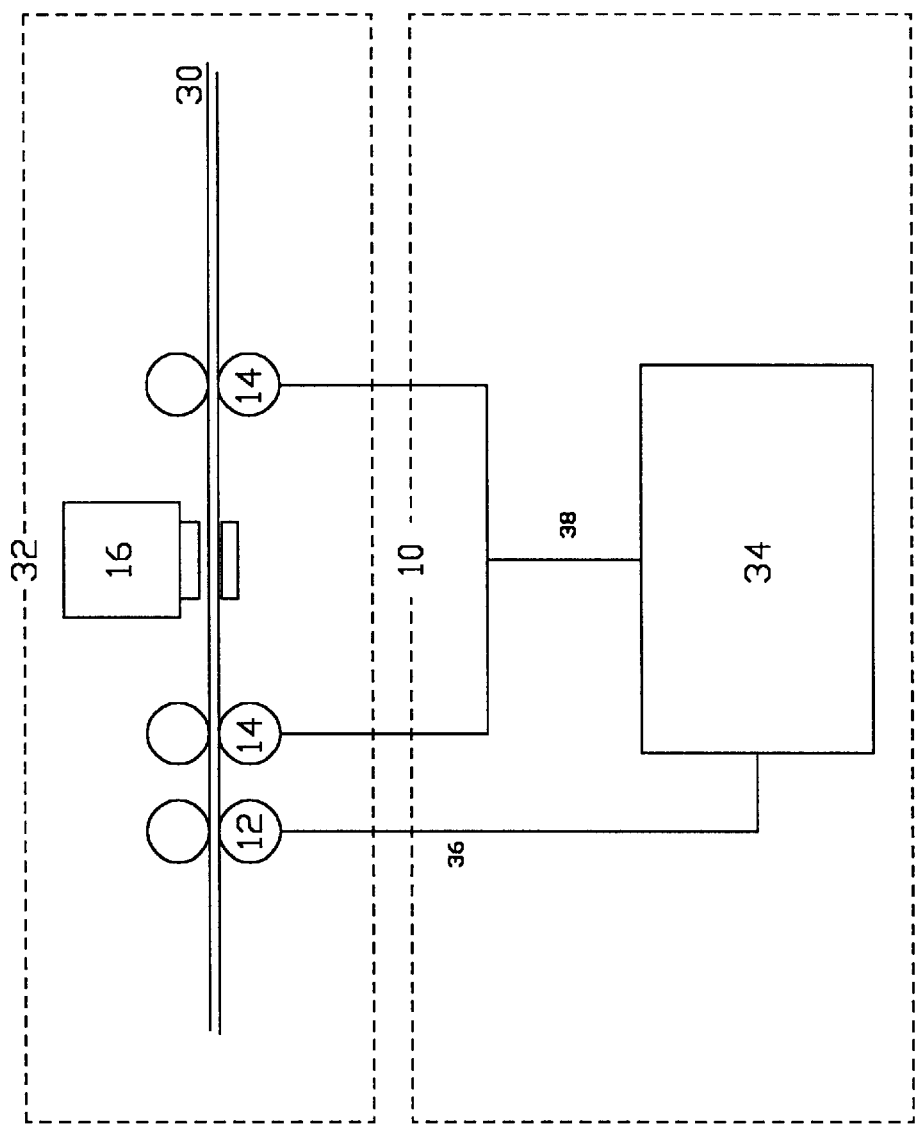
FIG. 1 shows a block diagram of one embodiment of the present inventive apparatus.
Figure 5:
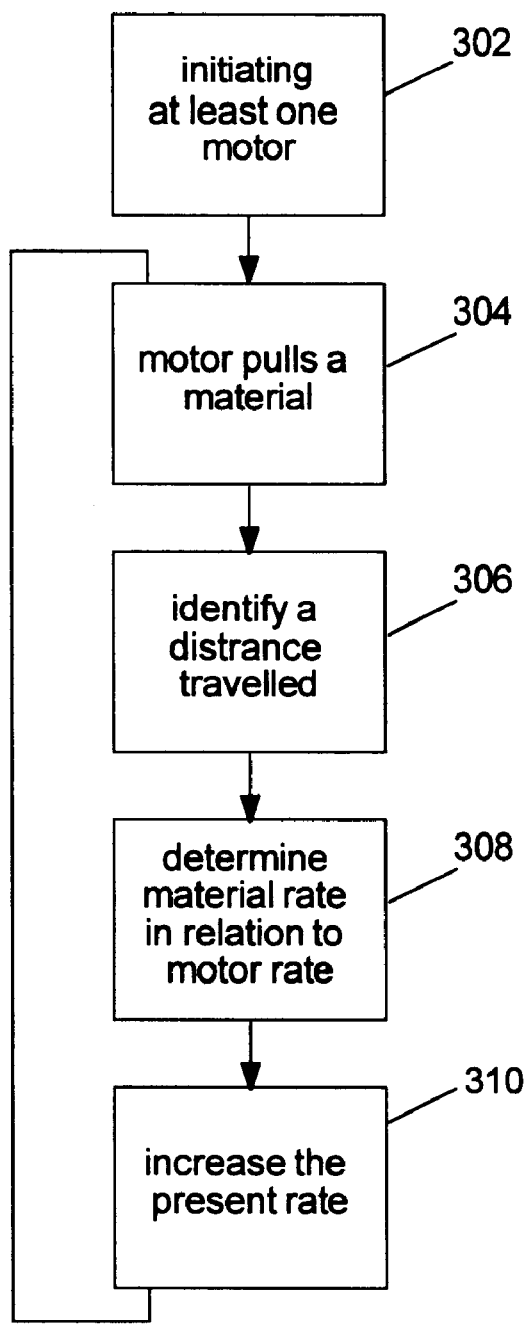
FIG. 5 shows a block diagram of one embodiment of the present inventive method.

The present invention, as shown in FIG. 1, is a motor controller 10. An encoder 12 manipulates the motor controller 10 and, thereby, an assembly line 32 in a manner that is new and novel. The encoder 12 tracks the movement of a material 30 along the assembly line 32 and reports results of the tracking through electronic signals 36. Other motor control systems have used encoders as a part of a feedback loop, but none allow encoders to exert the level of control over the motors as accomplished in the present invention. These other motor control systems stall the assembly line when the encoders signal a problem so that someone can fix the problem. The present invention guides the motors 14 to move the material 30 along the assembly line 32. Other motor controllers control motors 14 based on anticipated movements of the material 30. The present invention is a motor controller that will control the motors 14 based on the encoder 12 indications of the movements of the material.

The present invention is a motor controller 10 for controlling motors 14 and manipulating equipment 16 along an assembly line 32. The movement motors 14, manipulating equipment 16 and assembly line 32 engage a material 30 in movement across the assembly line 32. The invention includes an encoder 12 physically in contact with the material 30 on the assembly line 32. Electronic signals 36 are generated by the encoder 12 based on the material 30 movement. A programmable circuit 34 receives the electronic signals 36 and transmits control signals 38 to the movement motors 14 along the assembly line 32, wherein the control signals 38 initiate and accelerate the movement motors 14, then decelerate and stop the movement motors 14 when the material 30 has moved a preprogrammed distance.

In one embodiment of the invention the movement motors 14 are stepper motors. Another perspective with which to consider this invention is the steps taken by the stepper motors. The programmable circuit 34, in regular intervals, sends control signals 38 to the stepper motors 14. At start-up, the control signals 38 are steadily increasing the speed of the stepper motors 14 in quick, regular steps. In the present invention, the encoder 12 is indicating to the programmable circuit 34, through the electrical signals 36, that the material 30 is moving at an increasing speed synchronously with the stepper motors 14. However, if the encoder 12 indicates to the programmable circuit 34 that the material 30 is no longer moving synchronously with the stepper motors 14, the next control signal 38 sent to the stepper motor 14 will repeat the last step. That step will continue to be repeated until the material 30 is again moving synchronously with the stepper motors 14.

One narrower embodiment of the motor controller 10 occurs wherein the electronic signals 36 are step signals and each step signal corresponds to the material 30 moving the preprogrammed distance along the assembly line 32.

Another embodiment, as shown in FIG. 2, involves the programmable circuit 34 having a data memory 116 and a latch 120. The data memory 116 stores a set of anticipated control data 118. The latch 120 is connected to the data memory 116 and, indirectly, to the encoder 12. When the latch 120 receives a modified electronic signal 142 indirectly from the encoder 12 and the set of anticipated control data 118 from the data memory 116, the latch 120 generates control signal data 121. The control signal data 121 is thereafter modified to generate the control signals 38 thereby using the modified electronic signal 142 to filter the anticipated control data 118 and eventually generate the control signals 38.

A final narrower embodiment of the programmable circuit 34 includes an operator counter 20. The system enables the operator counter 20 to allow the operator to modify the total length traveled for each feed sequence. Connected to the encoder 12, the operator counter 20 modifies a clock pulse based on a distance traveled by the material 30.

FIG. 3 shows another embodiment of the motor controller with a fully functional and well-defined programmable circuit 34. Other programmable circuits could be devised by those skilled in the art while still enjoying the benefits of the novelty of the present invention. At power up, the power on reset circuit 102 provides a momentary high to the set input 106 of flip-flop 108. Flip flop 108 produces a high condition at its output 110, which arms AND circuit 112. The power on reset circuit 102 also resets the 16-bit ramp counter 22 to zero. The 16-bit ramp counter 22 directly transmits data to the 16-bit memory chip 116. This data transmission causes the value stored at address zero to appear on the memory data lines 118 (after a nominal propagation delay from the memory chip 116). Data is now waiting on the memory data lines 118 of latch 120. When power is applied to sequential counter 124, the sequential counter 124 will either attempt to start and halt because of a no-operation condition at its clock enable active low input 126 developed from AND 128 or the sequential counter 124 will go through a complete cycle until it arrives back at its output Q0 201.

The sequential counter 124 supplies all internal maintenance and control pulses for the programmable circuit 34. The 16-bit countdown counter 130 has counting down clock pulses from the 4 MHz clock 122, both of which have been running since power up. Each time the 16-bit countdown counter 130 counts down past zero, it supplies an MSB (most significant bit) pulse 132 to the divide-by-32 stepper motor pulse source 134, which is currently held in a no-output condition and also supplies a pulse to one-shot 136. Each pulse from one-shot 136 sets flip flop 138, which sets AND 128 to a low state, which is applied to the clock enable low input 126 of the sequential counter 124 beginning the cycle for the sequential counter 124. The only active devices enabled on the first cycle of the sequential counter 124 are the one-shot disable 143 and the data load line 147 of the 16-bit countdown counter 130. When output Q2 203 of sequential counter 124 goes high, it sets the output of the one-shot disable 143 to high arming AND 140. The sequential counter 124 then counts through output Q3 204, which resets flip-flop 138 giving it a high output that is applied to AND 128. Next, sequential counter 124 sets output Q4 205 high, which resets the sequential counter 124. This reset causes output Q0 201 to go high, which causes AND 128 to provide a high output to the clock disable low input 126 of the sequential counter 124. This high input causes sequential counter 124 to halt operation and wait for the next pulse from one-shot 136. The next pulse from one-shot 136 starts another cycle as described above, but this time when output Q1 202 goes high for one clock pulse, AND 140 supplies a latch pulse 142 to latch 120 which latches in the memory data 118 from the first address of memory chip 116. This data now appears as latch data 121 at the data input of the 16-bit countdown counter 130. The next clock pulse to sequential counter 124 causes output Q2 203 to go high for one clock pulse. The pulse 147 is again applied to the 16-bit countdown counter 130, which causes the data 121 for the first address to be loaded into the 16-bit countdown counter 130. The 16-bit countdown counter 130 now counts down the number of clock pulses 122 corresponding to the data loaded from memory 116 via latch 120 until it passes through zero and the cycle repeats, providing accurately timed pulses to the divide-by-32 stepper motor drive pulse source 134, which is still held at the initial no-output condition. The programmable circuit 34 is now prepared and will operate as soon as it is initiated.

The programmable circuit 34 is initiated by a feed operation request. A feed operation request is generated as a ram-down request signal 148 from the cutting press 16 or a signal from the operator feed-advance switch 174. The ram-down request signal 148 is applied to OR 149. The output of OR 149 then goes high, causing one-shot 150 to provide a single pulse, which sets flip-flop 152. Flip-flop 152 changes state, the normally high output 211 goes low, removing the reset condition on the 16-bit counter 22 and the operator counter 20 through OR 154. The normally low output 213 of flip-flop 152 now goes high enabling the stepper motor devide-by-32 drive source 134 to begin supplying step drive pulses 38 to the stepper motor drive amps 156 which cause the stepper motors 14 to begin to move. Feed advance of the system begins, causing the encoder 12 to change state. These changes are decoded into clock pulses 158 and direction pulses 160 by decoder 18. The direction pulse 160 is applied to ramp counter 22 to provide the correct direction of counting throughout the feed process. The clock pulse 158 is applied to the output delay window 162 to disable any false high information that may come from memory circuit 116 as a new address is achieved. Clock pulse 158 is also applied to the one-shot disable gate 143 to cause the latch enable pulse 142 to be skipped for one cycle of the sequential counter 124 if it coincides with the clock pulse 158. This feature causes any false transitional information from memory circuit 116 to be ignored by latch 120.

Clock pulse 158 is also applied to AND 112, which is armed and gives an output to the clock input 114 of 16-bit ramp counter 22 advancing it to its next step. This advancement causes the information at the next available memory address from memory chip 116 to appear at latch 120 and be latched in by sequential counter 124 as previously described above. This data contains a slightly smaller value than the previous step (in the case of an accelerate ramp) and consequently provides a slightly shorter time duration step waveform to the stepper motors 14, thus increasing their speed. If the stepper motors 14 fail to advance the material 30 for any reason, the programmable circuit 34 continues to deliver the same waveform to the stepper motors 14 until the system advances, thus providing a constant speed. This continued pulse rate at the assigned speed is one more reason for the success of the controller 10. Once the material 30 is properly advancing again, the programmable circuit 34 reverts to the previously described practice of providing slightly shorter time duration step waveforms to the stepper motors to continue increasing the stepper motors 14 speed. There is room for failure, so a faster normal-speed ramp can be programmed into memory circuit 116, and the controller 10 will compensate for motor losses or losses due to friction or slippage on the assembly line 32.

The aforementioned controller 10 continues to run as described and a unique accelerate ramp is created, one step at a time, while compensating for motor and/or assembly line losses for each feed cycle. Once the maximum feed speed is achieved, the end-of-accelerate ramp bit 175 is encountered from the memory circuit 116 through the output enable delay window 162. This end-of-accelerate ramp bit 175 is applied to AND 146. When the next sweep cycle of the sequential counter 124 supplies a clock pulse through output Q2 203 to the other leg of AND 146, a high signal is applied to the reset of flip-flop 108 and it resets. Resetting flip-flop 108 disarms AND 112 and halts clock pulses 177 to 16-bit ramp counter 22. The controller 10 continues to operate, at full speed, counting with the operator programmable counter 20 only, until the programmed count/feed distance is reached. Changes is in speed are the predominant source of assembly line errors. When the controller 10 is operating the motors 14 at maximum speed there is a much smaller chance of error because no changes in speed are required.

Once the operator programmed feed distance is reached, the operator counter 20 provides a high output to OR 104, which applies a high condition 106 to flip-flop 108 thus setting it and rearming AND 112, which returns clock pulses 177 and control to 16-bit ramp counter 22. This action causes the next information stored in memory circuit 116 to be read and executed by the controller 10. The next series of data stored in memory circuit 116 is the decelerate ramp. Execution of the deceleration information occurs the same way as the execution of the acceleration information. For deceleration, the time for each step is increasing with each step the motors 14 take, thereby slowing the motors 14 with each step. Next the end-of-decelerate ramp bit 176 appears from memory circuit 116 via the output enable delay window 162. The end-of-decelerate ramp bit 176 goes high, arming AND 144, and the sequential counter 124 supplies a high condition to the other input of AND 144, which causes AND 144 to reset the programmable circuit 34 to prepare for the next feed cycle.

An operator-preset number from operator counter 20 activates the cutting process. The cutting process starts the cutting press 16 in motion slightly before the end of the feed to allow the cutting die to contact the material 30 at the exact time that the feed cycle stops. This arrangement of decelerate curve and early starting of the cutting press 16 in motion improves the process speed by as much as 10%. The operator counter 20 supplies a high output to flip-flop 172, which causes AND 164 to supply a high condition to AND 164, which in turn supplies a high condition to the make-a-cut line 178 causing the cutting press 16 to make a cut. When the cutting press 16 finishes its cut and returns to the ram-up position, a high condition 179 is applied to one-shot 166 resetting flip-flop 172. Then the cutting press 16 supplies a ram-down request 148 and the whole process is repeated as described above.

The present invention also involves an inventive method 300 of controlling acceleration of motors along an assembly line. The first step in the method 300 involves initiating 302 at least one movement motor at a present rate. The movement motor pulls 304 a material along the assembly line at the present rate. An encoder identifies 306 a distance traveled by the material over regular time intervals. A programmable circuit determines 308 when the material is traveling at a same or substantially similar rate as the movement motor is attempting to move the material. When the material is traveling at the same rate as the movement motor is attempting to move the material, the programmable circuit incrementally increases 310 the present rate of the movement motors. The steps of this method are repeated until the movement motors and/or the material are moving at a desired constant rate. When deceleration is desired, the same method 300 is used, wherein the programmable circuit incrementally decreases the present rate of the movement motors as opposed to increases 310 the present rate.

A narrow embodiment of the method 300 occurs, wherein the encoder transmits step signals to the programmable circuit over the regular time intervals thereby providing the programmable circuit with the necessary information to determine when the material is moving at the same rate as the movement motor.

Another narrow embodiment of the method 300 occurs, wherein the programmable circuit contains a data memory, which stores an acceleration curve and a deceleration curve, which are used to determine 308 the incremental increases 310 in the present rate of the motor. A narrower embodiment of the method 300 occurs wherein the programmable circuit further contains a latch, wherein the latch transmits a signal from the data memory to the movement motors to incrementally increase 310 the present rate of the movement motor when the movement motor is operating at the same rate at which the material is traveling. Another narrower embodiment of the present method 300 further includes the step of programming an operator counter to initiate the deceleration curve when the material has traveled a predetermined distance.

The present invention as shown in FIG. 4 is also a system 400 for controlling motors along an assembly line 32, which has a material 30 on the assembly line 32. The system 400 includes a movement means 402 for moving the material 30 across the assembly line 32. The system 400 further includes a manipulating means 404 for manipulating at least a portion of the material 30 on the assembly line 32. Next there is a tracking means 406 for tracking the movement of the material 30 across the assembly line 32. Finally, the system includes a control means 408 for controlling the movement means 402 and the manipulating means 404 based on the input from the tracking means 406.

A narrower embodiment of the system 400 further includes a counting means 410 for counting actions taken by the movement means 402 and the manipulating means 404.

We claim:

1. A motor controller for controlling motors along an assembly line, the motors including at least one movement motor and at least one manipulating motor, the at least one movement motor engaging a material in movement across the assembly line, the controller comprising:

a programmable circuit;

an encoder physically in contact with the material on the assembly line;

at least one responsive electronic signal transmitted by the encoder to the programmable circuit, wherein the electronic signal is indicative of the material moving a preprogrammed distance; and at least one control signal transmitted from the programmable circuit and received by the movement motors relative to the electronic signals thereby causing the movement motors to maintain a present speed until the material moves the preprogrammed distance.

2. The motor controller of claim 1 wherein the electronic signals are step signals and each step signal corresponds to the material moving the preprogrammed distance along the assembly line.

3. The motor controller of claim 1 wherein the programmable circuit comprises:

a data memory, which stores a set of anticipated control data; and a latch connected to the data memory and, indirectly, to the encoder, wherein the latch receives a modified electronic signal indirectly from the encoder and the set of anticipated control data from the data memory and generates control signal data whereby when the encoder tracks a speed of the material equal to the speed of the movement motors, the generated control signal data increases the speed of the movement motors to a next step as defined by the anticipated control data.

4. The motor controller of claim 1 wherein the programmable circuit comprises:

a ramp control counter connected to the encoder and receiving the responsive electronic signal, wherein the ramp control counter controls an acceleration and a deceleration of the at least one movement motor when the material is moving the preprogrammed distance; and an operator counter connected to the encoder and the ramp control counter wherein the operator counter initiates the deceleration of the at least one movement motor.

5. A method of controlling motors along an assembly line, said method comprising the steps of:

initiating at least one movement motor at a present rate;

pulling a material along the assembly line using the movement motor;

identifying a distance traveled by the material over regular time intervals using an encoder;

determining when the material is traveling at a same rate as the movement motor using a programmable circuit; and incrementally increasing the present rate of the movement motors when the material is traveling at the same rate as the movement motor.

6. The method of claim 5 wherein the encoder transmits step signals to the programmable circuit over the regular time intervals thereby providing the programmable circuit with the necessary information to determine when the material is moving at the same rate as the movement motor.

7. The method of claim 5 wherein the programmable circuit contains a data memory, which stores an acceleration curve and a deceleration curve, which are used to determine the incremental increases in the present rate of the motor.

8. The method of claim 7 wherein the programmable circuit further contains a latch, wherein the latch transmits a signal from the data memory to the movement motors to incrementally increase the present rate of the movement motor when the movement motor is operating at the same rate at which the material is traveling.

9. The method of claim 7 further comprising the step of programming an operator counter to initiate the deceleration curve when the material has traveled a predetermined distance.

10. The method of claim 5 wherein the steps are repeated a plurality of times until the material reaches a final rate of movement.

11. A system for controlling motors along an assembly line, which has a material on the assembly line, the system comprising:

a movement means for moving the material across the assembly line;

a manipulating means for manipulating at least a portion of the material on the assembly line;

a tracking means for directly tracking movement of the material across the assembly line; and a control means for controlling the movement means and the manipulating means based at least partly on input from the tracking means.

12. The system of claim 11 further comprising a counting means for counting actions taken by the movement means and the manipulating means.

* * * * *